(12) United States Patent
Arrasvuori et al.

(10) Patent No.: US 8,984,090 B2
(45) Date of Patent: Mar. 17, 2015

(54) METHOD AND APPARATUS FOR PROVIDING DERIVATIVE PUBLICATIONS OF A PUBLICATION AT ONE OR MORE SERVICES

(75) Inventors: Juha Henrik Arrasvuori, Tampere (FI); Andrés Lucero, Tampere (FI); Marion Boberg, Suinula (FI)

(73) Assignee: Nokia Corporation, Espoo (FI)

( * ) Notice: Subject to any disclaimer, the term of this patent is extended or adjusted under 35 U.S.C. 154(b) by 115 days.

(21) Appl. No.: 13/545,662

(22) Filed: Jul. 10, 2012

(65) Prior Publication Data

US 2014/0019580 A1     Jan. 16, 2014

(51) Int. Cl.
| | |
|---|---|
| G06F 15/16 | (2006.01) |
| G06Q 10/10 | (2012.01) |
| G06Q 30/02 | (2012.01) |
| G06Q 50/00 | (2012.01) |

(52) U.S. Cl.
CPC .............. *G06Q 50/01* (2013.01); *G06Q 10/10* (2013.01); *G06Q 30/0241* (2013.01)
USPC .............................. 709/217; 709/203; 705/14

(58) Field of Classification Search
CPC ..................... H01L 21/76802; G06F 17/2755; G06F 7/588
USPC ..................................... 709/203, 217; 705/14
See application file for complete search history.

(56) References Cited

U.S. PATENT DOCUMENTS

| | | | |
|---|---|---|---|
| 7,725,499 B1* | 5/2010 | von Lepel et al. ............ | 707/803 |
| 8,116,269 B2* | 2/2012 | Luss et al. | |
| 2005/0197975 A1* | 9/2005 | Benson ........................ | 705/410 |
| 2006/0188012 A1* | 8/2006 | Kondo ....................... | 375/240.2 |
| 2007/0003340 A1* | 1/2007 | Yoshino ....................... | 399/366 |
| 2008/0005086 A1* | 1/2008 | Moore .............................. | 707/3 |
| 2008/0005666 A1* | 1/2008 | Sefton et al. .................. | 715/523 |
| 2009/0254529 A1 | 10/2009 | Goldentouch | |
| 2010/0153848 A1 | 6/2010 | Saha | |
| 2010/0332444 A1* | 12/2010 | Akatsu et al. .................... | 706/54 |
| 2011/0161178 A1* | 6/2011 | Rosenstein et al. ........ | 705/14.69 |
| 2011/0213670 A1 | 9/2011 | Strutton et al. | |
| 2011/0314101 A1 | 12/2011 | Redmon et al. | |
| 2012/0197688 A1* | 8/2012 | Townshend et al. ......... | 705/14.1 |
| 2013/0311346 A1* | 11/2013 | Winter ........................... | 705/37 |

FOREIGN PATENT DOCUMENTS

WO    WO 2011/067785 A2    6/2011

OTHER PUBLICATIONS

SocialMotus, "Social Media Management and Publishing Software Tool", pp. 1-4, retrieved from Internet on Apr. 24, 2012, < http://www.socialmotus.com/social-media-management-publishing.html >.

* cited by examiner

*Primary Examiner* — Tesfay Yohannes
(74) *Attorney, Agent, or Firm* — Alston & Bird LLP

(57) ABSTRACT

An approach is provided for providing a derivative publication of a publication at one or more services. The publishing service platform processes and/or facilitates a processing of at least one publication to cause, at least in part, a generation of at least one derivative publication. Next, the publishing service platform determines at least one service for publishing the at least one derivative publication. Then, the publishing service platform causes, at least in part, a transmission of the at least one derivative publication to the at least one service for publication.

18 Claims, 13 Drawing Sheets

METHOD AND APPARATUS FOR PROVIDING DERIVATIVE PUBLICATIONS OF A PUBLICATION AT ONE OR MORE SERVICES

BACKGROUND

Service providers and device manufacturers (e.g., wireless, cellular, etc.) are continually challenged to deliver value and convenience to consumers by, for example, providing compelling network services. For example, such network services may include intermediate publication services that enable communication between users and sharing of different published content (e.g., textual data, images, videos, audio files, etc.) between the users. To maximize the exposure of a publication, typical intermediate publication services repeatedly transmit the same publication to more than one network service. Such actions, however, may be perceived as spamming by users, filters, etc., reducing the effectiveness and efficiency of those publication services.

SOME EXAMPLE EMBODIMENTS

Therefore, there is a need for an effective and efficient approach for increasing exposure of an initial publication, for instance, by deriving publications from the initial publication and publishing the derived publications at one or more publication services.

According to one embodiment, a method comprises processing and/or facilitating a processing of at least one publication to cause, at least in part, a generation of at least one derivative publication. The method also comprises determining at least one service for publishing the at least one derivative publication. The method further comprises causing, at least in part, a transmission of the at least one derivative publication to the at least one service for publication.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of at least one publication to cause, at least in part, a generation of at least one derivative publication. The apparatus is also caused to determine at least one service for publishing the at least one derivative publication. The apparatus is further caused to transmit at least one derivative publication to the at least one service for publication.

According to another embodiment, a computer-readable storage medium carries one or more sequences of one or more instructions which, when executed by one or more processors, cause, at least in part, an apparatus to process and/or facilitate a processing of at least one publication to cause, at least in part, a generation of at least one derivative publication. The apparatus is also caused to determine at least one service for publishing the at least one derivative publication. The apparatus is further caused to transmit at least one derivative publication to the at least one service for publication.

According to another embodiment, an apparatus comprises means for processing and/or facilitating a processing of at least one publication to cause, at least in part, a generation of at least one derivative publication. The apparatus also comprises means for determining at least one service for publishing the at least one derivative publication. The apparatus further comprises means for causing, at least in part, transmission of the at least one derivative publication to the at least one service for publication.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing any of the methods described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing derivative publications of a publication at one or more services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
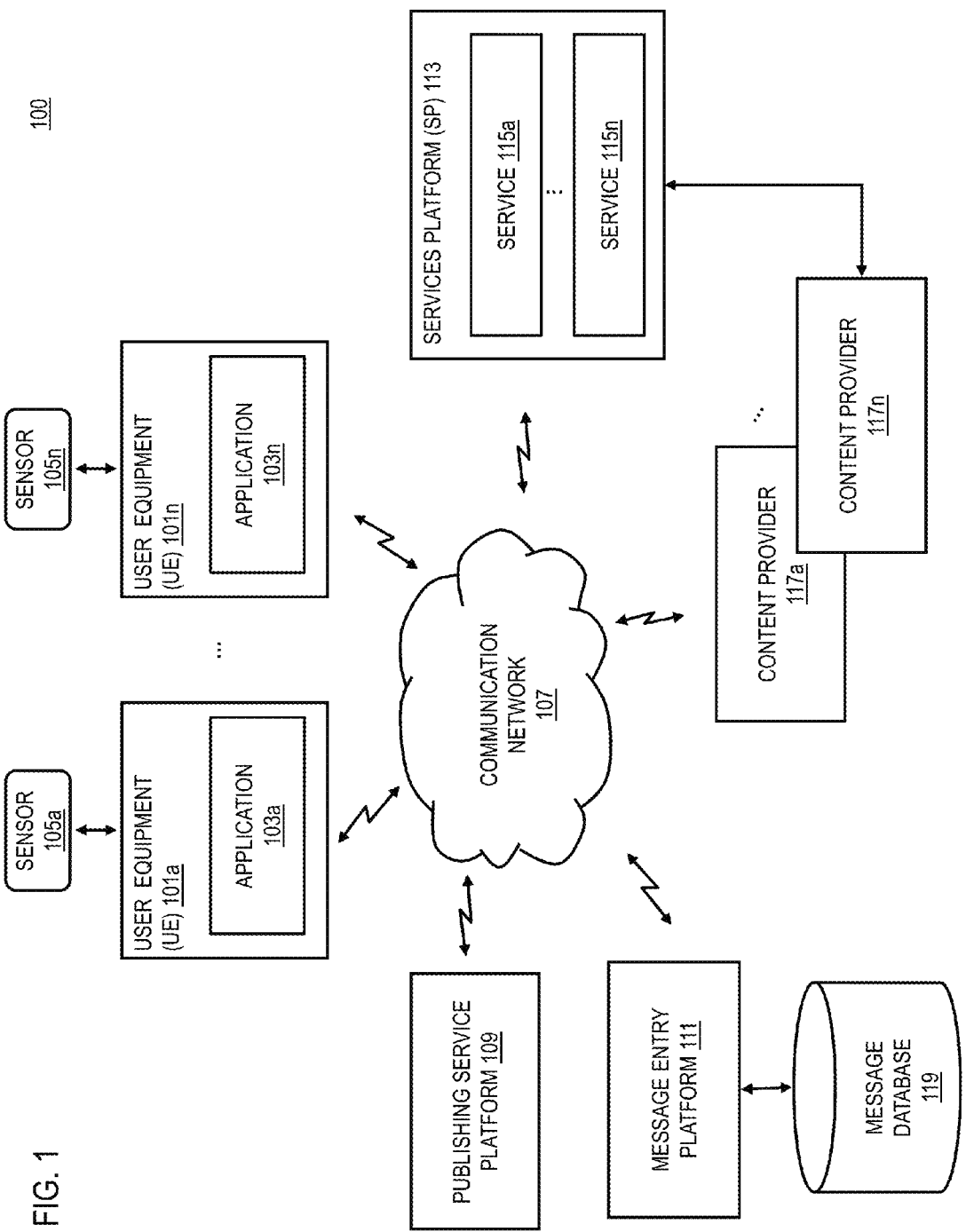
FIG. 1 is a diagram of a system capable of providing a derivative publication of a publication at one or more services, according to one embodiment.

FIG. 1 is a diagram of a system capable of providing a derivative publication of a publication at one or more services, according to one embodiment. As mentioned, service providers and device manufacturers are continually challenged to provide compelling network services, that may include intermediate publication services that enable communication between users and sharing of different published content (e.g., textual data, images, videos, audio files, etc.) between the users. To maximize the exposure of a publication, typical intermediate publication services repeatedly transmit the same publication to more than one network service. Such actions, however, may be perceived as spamming by users, filters, etc., reducing the effectiveness and efficiency of those publication services.

To address this problem, a system 100 of FIG. 1 introduces the capability to provide derivative publications of a publication at one or more services. Specifically, the system 100 may process a publication to cause a generation of a derivative publication. The system 100 may then determine a service for publication of the derivative publication, and transmit the derivative publication to the service for publication. By way of example, the system 100 may split an original posting submitted by a user into a number of various postings (e.g., based on the type of media, subject matters, etc., in the original posting) derived from the original posting. The system 100 may then determine one or more social media services that will provide the best exposure for each of the derived postings, for instance, based on the rankings of certain topics recently posted at a social media service, the types of media posted at a social media service, etc.

As shown in FIG. 1, the system 100 comprises user equipment (UE) 101a-101n (collectively referred to as UEs 101) that may include or be associated with applications 103a-103n (collectively referred to as applications 103) and sensors 105a-105n (collectively referred to as sensors 105). By way of example, the applications 103 may be any type of application that is executable at the UE 101, such as media player applications, social networking applications, navigational applications, calendar applications, content provisioning services, etc. In one embodiment, one of the applications 103 at the UE 101 may act as a client for publishing service platform 109 and perform one or more functions associated with the functions of the publishing service platform 109. In addition, the sensors 105 may be any type of sensor. In one embodiment, the sensors 105 may include one or more sensors that are able to determine user published contents associated with UE 101. In one scenario, the sensors 105 may include location sensors (e.g., GPS), light sensors, moisture sensors, pressure sensors, audio sensors (e.g., microphone), or receivers for different short-range communications (e.g., Bluetooth, WiFi, etc.).

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the publishing service platform 109 may be a platform with multiple interconnected components. The publishing service platform 109 may include multiple servers, intelligent networking devices, computing devices, components and corresponding software for performing the function of providing user published content. The publishing service platform 109 is a platform that determines and processes user published contents associated with a device to determine a network service suitable for maximum exposure of a publication. As described below, the publishing service platform 109 may perform the functions of providing an intermediate service for maximizing exposure to user published content. Although illustrated as a separate element of the system 100 in FIG. 1, publishing service platform 109, or one or more functions performed by the publishing service platform 109, may be embodied in one or more other elements of the system 100, such as in one or more applications 103 of the UEs 101 or one or more services 115.

In one embodiment, the publishing service platform 109 identifies and provides the user with multiple social media services for publishing derivative publications generated from an original publication. To increase exposure of the contents of the original publication, the publishing service platform 109 may, for instance, look for ways to split, condense, extend, or in any other way modify the original posting into one or more derivative postings, each of which may be more relevant to various social media services than the original posting. In another embodiment, the publishing service platform 109 determines which social media service (or channel of such service) offers the best exposure to the "split posting" at a given time, for example, based on a determination that the split posting is the most relevant fits for a most recently discussed topic, that the split posting is similar to the most frequently viewed item at the service, and/or that the split posting matches an earlier posting by other users of the service. In some embodiments, the publishing service platform 109 could also diversify the postings by randomizing the contents so that videos from only being posted to a particular video sharing service, texts from only being posted to a particular text sharing service, and photos from only being posted to a particular photo sharing service. In one scenario, an original publication may include several videos and summaries for the videos that are relevant to each other (e.g., videos and summaries of the same genre and audience type). The original publication may then process to generate numerous portions, including audios from the videos, images from the videos, short summaries for the audios, images, and the videos, etc. These portions may thereafter be randomly categorized into various groups of media items, and each group may be processed to produce at least one derivative publication. Thus, although a short summary in one group may not be about a video in the same group, that particular short summary may be merged with the video to provide a derived video that includes information about another video that the short summary corresponds to (e.g., to advertise the other video). In this way, the derivative postings of the original publication may continue to be diverse.

In various embodiments, the publishing service platform 109 may determine a publication that is published by a mobile device upon the occurrence of an event (e.g., detection of the publishing at a social media service) at the mobile device to increase exposure of the publication. For example, the publishing service platform 109 retrieves published content of the UE 101 from the applications 103, the sensors 105, the message entry platform 111, and processes the published content to obtain a relevant derivative content. During processing, the publishing service platform 109 may, for instance, analyze the original posting to determine whether the original posting can be split into different media types. In one scenario, for instance, when a UE 101 publishes a 60-second video with a text description of the video's contents on a video sharing service, the video along with the text description may be detected and retrieved. The publishing service platform 109 may then analyze the video and its text description to generate one or more split publications from the video and its text description. In addition, the publishing service platform 109 may thereafter determine one or more social media services for publishing the split publications, for example, based on "hot topics" at targeted social media services, media types offered at the targeted social media services, etc. Consequently, the publishing service platform 109 may cause a transmission of the split publications to its respective determined social media service. In a further scenario, the publishing service platform 109 may search for current "hot topics" at one or more social media services. The publishing service platform 109 then automatically summarizes the text description of the video and posts the short summary along with a link to the original publication on a selected text-only sharing social media service.

The message entry platform 111 with the message database 119 (e.g., a collection of publications/posts that are selected by the publishing service platform 109 and transmitted to the social media services) may, for instance, provide updates to the publishing service platform 109. By way of example, each time a UE 101 sends a publication request, the message entry platform 111 automatically updates its message archive (e.g., the message database 119), and updates the publishing service platform 109 accordingly. Further, the message entry platform 111 compares the content information of the publications and ranks them on the basis of their popularity or relevance at a social media service. For example, when a particular topic becomes popular at a social channel of a social media service, the publishing service platform 109 may obtain publications archived by the message entry platform 111 based on the popular topic, process those publications to generate derivative publications based on the popular topic, and provide the derivative publications to that social media service for publishing purposes.

The services platform 113 may include any type of service. By way of example, the services 115 may include social networking services, content (e.g., audio, video, images, etc.) provisioning services, navigational services, application services, storage services, contextual information determination services, location based services, information (e.g., weather, news, etc.) based services, etc. The social networking and content provisioning services may determine publications associated with the UE 101 to supplement or aid in the publications acquired by the applications 103 and/or the sensors 105. The services 115 may interact with the UE 101, the publishing service platform 109, message entry platform 111 and the content providers 117.

By way of example, a social networking service 115 may be an online service that reflects social networks or social relations among users who may share their relationships, interests and/or activities. In one scenario, the social networking service 115 provides representations of each user (e.g., a profile), his/her social links, and a variety of additional information. The social networking service 115 allows users to share ideas, activities, events, and interests within their individual networks, and provides for data portability. The social networking service 115 may additionally assist in providing the publishing service platform 109 with "hot topics" associated with content uploaded by users.

The content providers 117 may provide content to the UE 101, the publishing service platform 109, the message entry platform 111 and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in the processing of user publications. In one embodiment, the content providers 117 may also store content associated with the UE 101, the publishing service platform 109, message entry platform 111 and the services 115 of the services platform 113. In one embodiment, the content providers 117 may manage access to a central repository of data, and offer a consistent, standard interface to data, such as a repository of user published content.

By way of example, the UE 101, the publishing service platform 109, the message entry platform 111, the services platform 113 and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
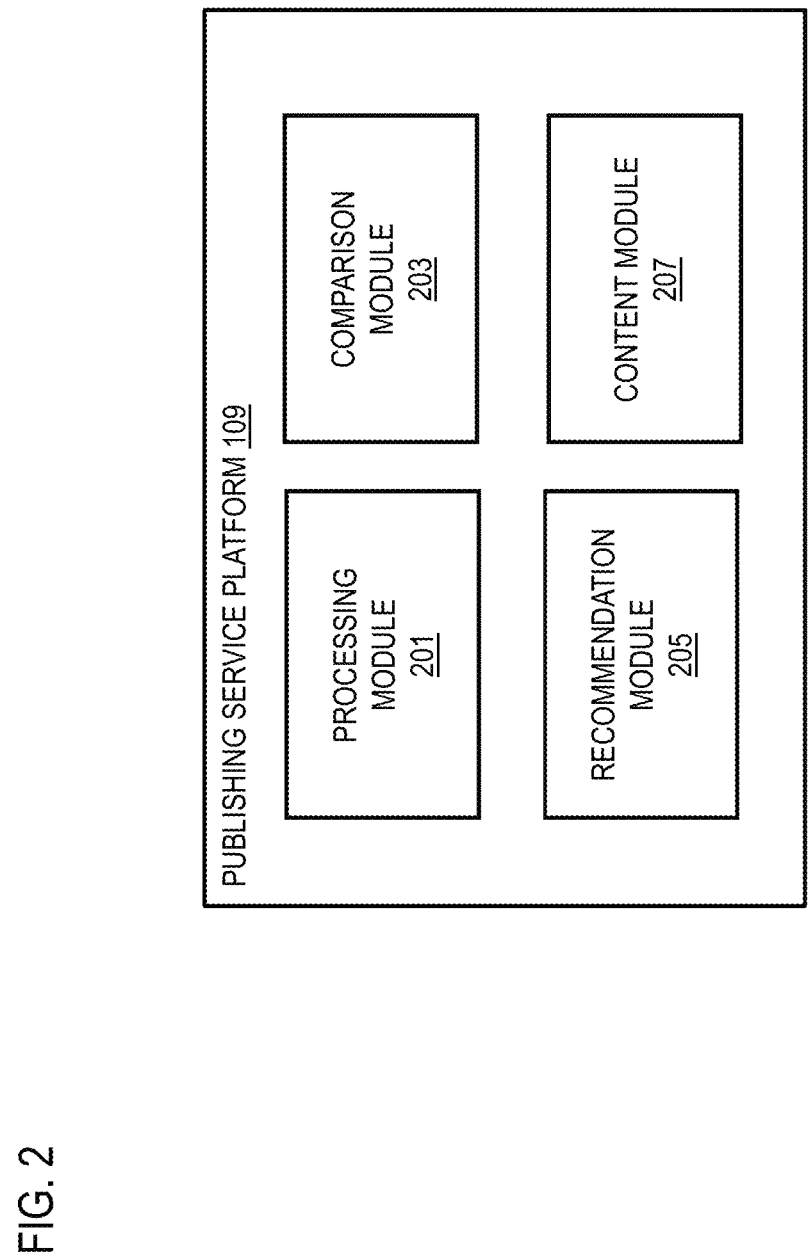
FIG. 2 is a diagram of the components of a publishing service platform, according to one embodiment.

FIG. 2 is a diagram of the components of the publishing service platform 109, according to one embodiment. By way of example, publishing service platform 109 includes one or more components for providing a derivative publication of a publication at one or more services. As discussed above, it is contemplated that the functions of these components may be combined in one or more components or performed by other components of equivalent functionality. In this embodiment, the publishing service platform 109 includes a processing module 201, a comparison module 203, a recommendation module 205, and a content module 207.

By way of example, the processing module 201 may execute one or more algorithms to process the publications to: (a) determine topics of the original posting by analyzing key words of the publication, (b) determine media types of the original posting, (c) cause splitting of original posting into different media types, (d) determine rankings of media services based on the popularity of the user published content, and (e) cause selection of the publication based on the preference and popularity amongst the users of the social media services.

In some embodiments, the comparison module 203 compares the social media services and prioritizes the publication based on its popularity in the social media services. In addition, the comparison module 203 may update the publishing service platform 109. In one scenario, each time a UE 101 sends a publication with a request for maximum exposure, the comparison module 203 monitors for updates continuously, periodically, according to a schedule, on demand, or a combination thereof. In one embodiment, the comparison module 203 ensures that the publications are free from encryptions that may limit the use of the publications, the copying of the publications, the transfer of the publications, etc. In this manner, the publications are freely transferable from one social media services to another, while operating properly. In certain embodiments, the comparison module 203 compares the social media services and their respective compatibilities with the publications, and then sends data and suggestions to the recommendation module 205.

In some embodiments, the recommendation module 205 may perform recommendations of a social media service based on the popularity of the user published contents on the social media service associated with the UE 101, which may be determined once the publication information is processed by the processing module 201. For example, as the processing module 201 processes the publication information, the comparison module 203 recommends, according to the rankings of the social networks based on their popularity and/or coverage and/or compatibility. In other embodiments, the recommendation module 205 determines whether a preferred publication is available on the preferred social network for the requesting UE 101. If, for instance, a preferred publication is not available on the preferred social network, the recommendation module 205 may provide to the publishing service platform 109 a service network having the preferred publication. In one embodiment, the publishing service platform 109 requests the publication information for the social network from, for example, one or more content providers 117. In some embodiments, the user may publish his rating to a media item as a publication. Such publication would include the rating, information about the user who gave the rating, and a link to the media item. The user may have defined beforehand that a certain rating given by him to a media item causes the publication in a certain service and a derivative publication in at least one other service. Thus, the user may define that if he rates the media with 5 stars, the intermediate service generates more derivative publications than if the user would rate the media item with only 1 star.

The content module 207 enables the publishing service platform 109 to determine the contents associated with a publication by collecting or determining content information associated with the device. In one embodiment, the content module 207 may determine content information from the message entry platform 111, the applications 103 executed at the UE 101 and/or one or more services 115 on the services platform 113. As the UE 101 sends a request for publication to the publishing service platform 109, the content module 207 provides the publishing service platform 109 with content information (e.g., summaries, titles, pictures, etc.).

Figure 3:
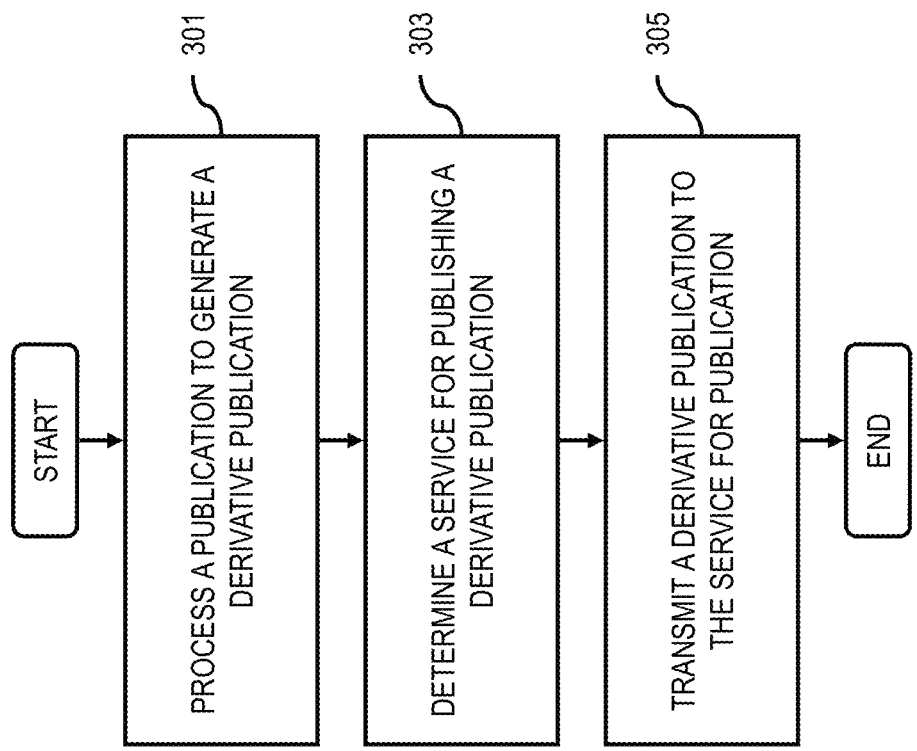
FIG. 3 is a flowchart of a process for providing a derivative publication of a publication at one or more services, according to one embodiment.
Figure 12:
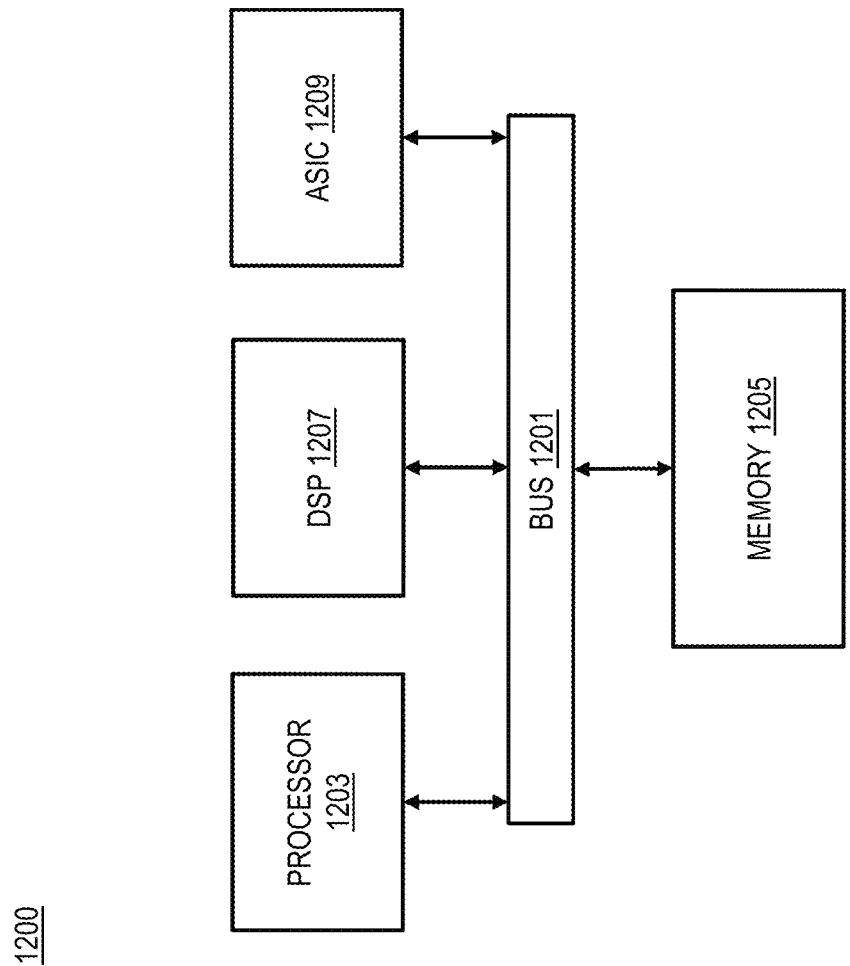
FIG. 12 is a diagram of a chip set that can be used to implement an embodiment of the invention.

FIG. 3 is a flowchart of a process for providing a derivative publication of a publication at one or more services, according to one embodiment. In one embodiment, the publishing service platform 109 performs the process 300 and is implemented in, for instance, a chip set including a processor and a memory as shown in FIG. 12. In step 301, the publishing service platform 109 may process and/or facilitate a processing of at least one publication to cause, at least in part, a generation of at least one derivative publication. In one scenario, for instance, a user creates and submits an original posting from UE 101. The posting transmits through the message entry platform 111 and is delivered to the first intended social media service and a copy of it is delivered to the publishing service platform 109, as per the request sent from a UE 101. Such transmission of the request between the UE 101 and the publishing service platform 109 results in the publishing service platform 109 obtaining the original posting from a UE 101 and processing the original publication to generate a derivative publication. Subsequently, the publishing service platform 109 determines the topic of the original posting by analyzing keywords in it. Further, the publishing service platform 109 analyzes the original publication to determine the media types of the original publication (e.g., textual data, images, videos, etc.). In addition, the publishing service platform 109 analyzes the original posting to determine whether the original posting can be split into different media types. The media files for the original posting may originate from the user's client device, an external device, or a service. As discussed in detail below, the split-media type determined by the publishing service platform 109 may include but is not limited to, for example, splitting of videos into images and sound, or a video can be generated from photos by obtaining a soundtrack. In some embodiments, the publishing service platform 109 splits the original posting into as many media types as possible for maximum exposure.

In step 303, the publishing service platform 109 may determine at least one service for publishing the at least one derivative publication. For example, in one scenario, the publishing service platform 109 identifies the optimal social media service for each split posting (derived from the original publication) based on their compatibility with the media types of the split postings and/or other criteria. The selection of the social media service for a split posting may, for instance, be based on the media types offered by a social media service, the popularity of certain subject matter at a social media service (e.g., whether the topic of the original publication is currently discussed, relevant, and/or popular at a service channel of a social media service), etc. In certain embodiments, the publishing service platform 109 may, for instance, utilize keywords identified in popular topics of a particular service types (e.g., video sharing, image sharing, etc.) and utilize those keywords in making its publishing recommendations. In other embodiments, the publishing service platform 109 may post the derivative publication as an automatic reply to an earlier posting in a social media service by some subscribers (e.g., if the topic matches). In other embodiments, the publishing service platform 109 may post the derivative publication as a combination of the derived publication and at least a part of a comment posted to it by at least one other user. The fully or partially included comment may be textual data, images, audios, videos or some other media.

In step 305, the publishing service platform 109 may cause, at least in part, a transmission of the at least one derivative publication to the at least one service for publication. In one use case, for instance, the publishing service platform 109 determines that a particular social media service offers the best exposure to the "split posting" at a given time based on a determination that the split posting is the most relevant fits for a most recently discussed topic, that the split posting is similar to the most frequently viewed item at the service, and/or that the split posting matches an earlier posting by other users of the service. As such, the publishing service platform 109 will transmit the split posting to the social media service for publishing.

Figure 4:
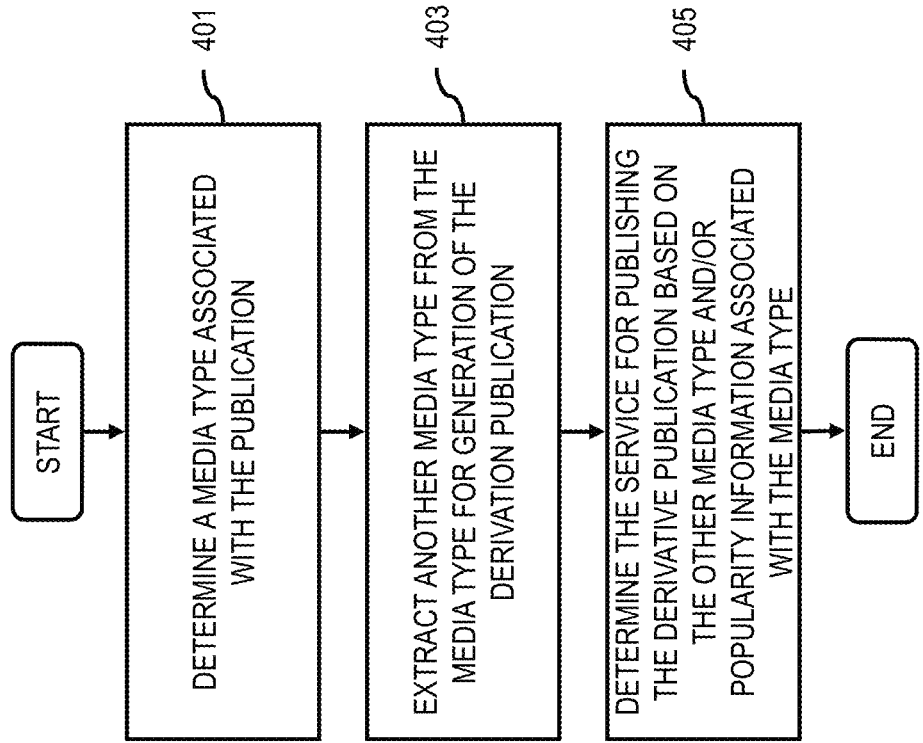
FIG. 4 is a flowchart of a process for determining a social media service based on a media type, according to one embodiment.

FIG. 4 is a flowchart of a process for determining a social media service based on a media type, according to one embodiment. In one embodiment, the publishing service platform 109 performs the process 400 and is implemented in, for instance, a chip set including a processor and a memory as shown in FIG. 12. In step 401, the publishing service platform 109 may determine at least one media type associated with the at least one publication. In one embodiment, the publishing service platform 109 obtains an original posting from a UE 101 and processes the original publication to generate a derivative publication. The publishing service platform 109 further analyzes the original publication to determine the media type of the original publication. For example, the original publication may include content of various media types, including texts, photographs, videos, graphics, audio files, etc. In addition, it is noted that the publishing service platform 109 may divide portions of the original publication into further sub-portions. A text portion of the publication may, for instance, be derived into paragraph-sized summary, sentence-sized topic. In addition, a video may be split into pictures and sounds, and those pictures and sounds may be posted to different social media services.

In step 403, the publishing service platform 109 causes extraction of at least one other media type from the at least one media type, wherein the at least one derivative publication is based, at least in part, on the at least one other media type. By way of example, the publishing service platform 109 analyzes the original posting to determine whether the original posting can be split into different media types. As indicated, in one use case, the original posting may be a video. As such, the original posting may be divided into images and sounds, and those images and sounds may be posted at various social media services. Thus, in step 405, the publishing service platform 109 may determine the at least one service for publishing the derivative publication based, at least in part, on the at least one other media type, popularity information associated with the at least one media type in the at least one service, or a combination thereof.

Figure 5:
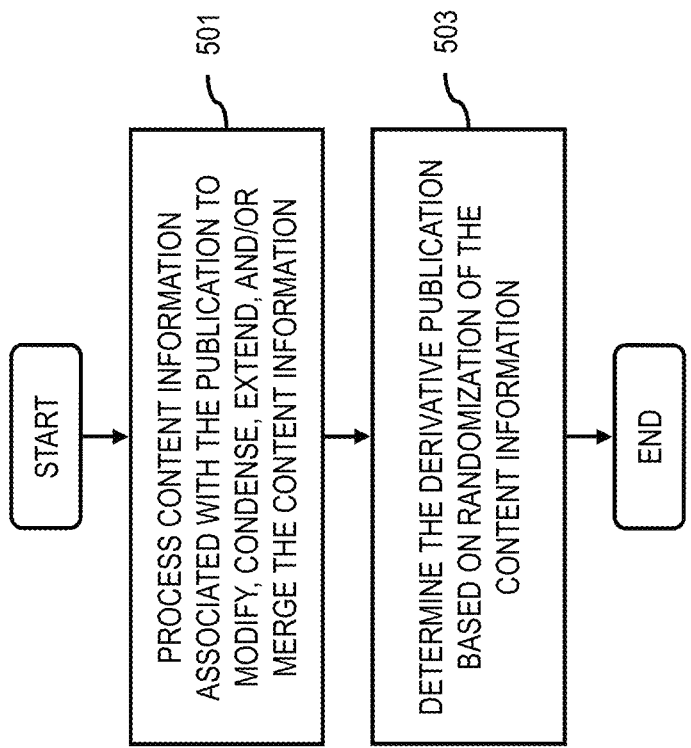
FIG. 5 is a flowchart of a process for determining a derivative publication, according to one embodiment.

FIG. 5 is a flowchart of a process for determining a derivative publication, according to one embodiment. In one embodiment, the publishing service platform 109 performs the process 500 and is implemented in, for instance, a chip set including a processor and a memory as shown in FIG. 12. In step 501, the publishing service platform 109 processes and/or facilitates a processing of content information associated with the publication to cause, at least in part, a modification, condensing, extension, and/or merging of the content information. In certain embodiments, a derivative publication (generated from the publication) is based, at least in part, on such modification, condensing, extension, and/or merging of the publication. For example, in one scenario, an original article with a video posting and a long textual summary may be split into the video and the long textual summary. The video may then be condensed and modified to form a shorter video, and small relevant portions of the textual summary may be merged with to the video as video captions. As such, the new video with the video captions may be the derivative publication generated from the original article. Consequently, increased exposure to the contents of the original article may be provided without having to repost the exact same article at a different social media service. Moreover, the contents of the original article may now be exposed to users at social media services that only publish videos (e.g., a video-only sharing service) through the derived video, even though the original article could not have been shared via such social media services.

In step 503, the publishing service platform 109 may also determine the at least one derivative publication based, at least in part, on a randomization of the content information. In certain embodiments, such randomization of the content information may be used to prevent spamming and to diversify the exposure potential of the original publications, for instance, by ensuring that derived publications are distinct and will not always be posted to the same social media services. For instance, randomization may be provided to prevent videos from only being posted to a particular video sharing service, texts from only being posted to a particular text sharing service, and photos from only being posted to a particular photo sharing service.

Figure 6:
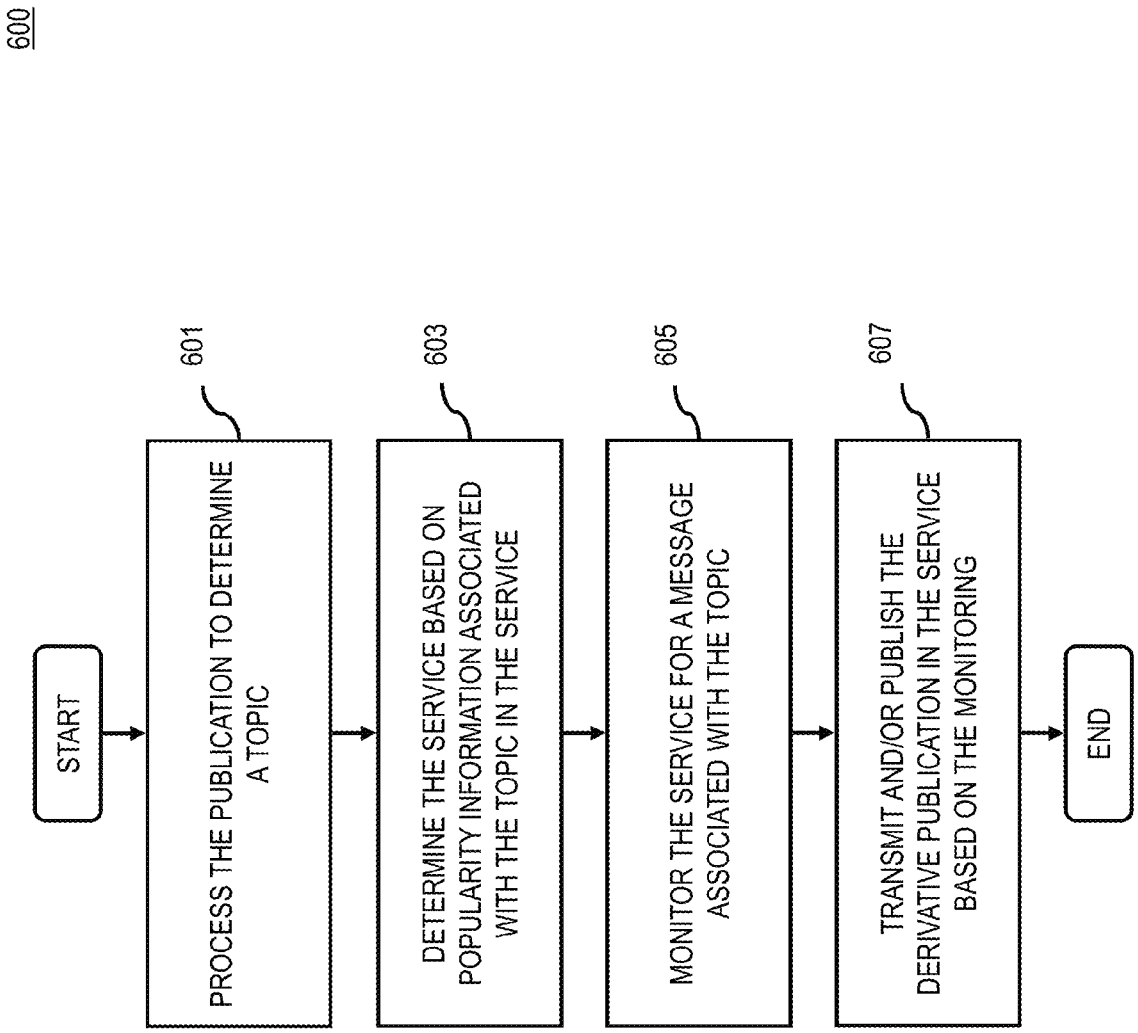
FIG. 6 is a flowchart of a process for determining a social media service based on a topic associated with a publication and the service, according to one embodiment.

FIG. 6 is a flowchart of a process for determining a service based on a topic associated with a publication and the service, according to one embodiment. In one embodiment, the publishing service platform 109 performs the process 600 and is implemented in, for instance, a chip set including a processor and a memory as shown in FIG. 12. In step 601, the publishing service platform 109 may process and/or facilitate a processing of the at least one publication to determine one or more topics. By way of example, the publishing service platform 109 receives and analyzes an original posting to determine the topic of the original publication by analyzing the keywords in the original publication. In step 603, the publishing service platform 109 may determine the at least one service based, at least in part, on popularity information associated with the one or more topics in the at least one service. For example, the publishing service platform 109 identifies the optimal social media service for each split posting by determining the popularity of the topic and/or the relevance of the topic in a social media service. In one embodiment, the publishing service platform 109 monitors the social media services and extracts from the original publication relevant information for those social media services.

In step 605, the publishing service platform 109 may cause, at least in part, a monitoring of the at least one service for one or more messages associated with the one or more topics. Then, in step 607, the publishing service platform 109 may cause, at least in part, the transmission, the publication, or a combination thereof of the at least one derivative publication in the at least one service based, at least in part, on the monitoring. In one scenario, the publishing service platform 109 presents a user with the automatically generated derivative publication (from the original publication) and proposes a target social media service based on the relevant topic determined with respect to both the original publication and the messages at the target social media service. Once the user of UE 101 approves the recommendation, the publishing service platform 109 will then transmit the derivative publication to the determined social media services for publication.

Figure 7:
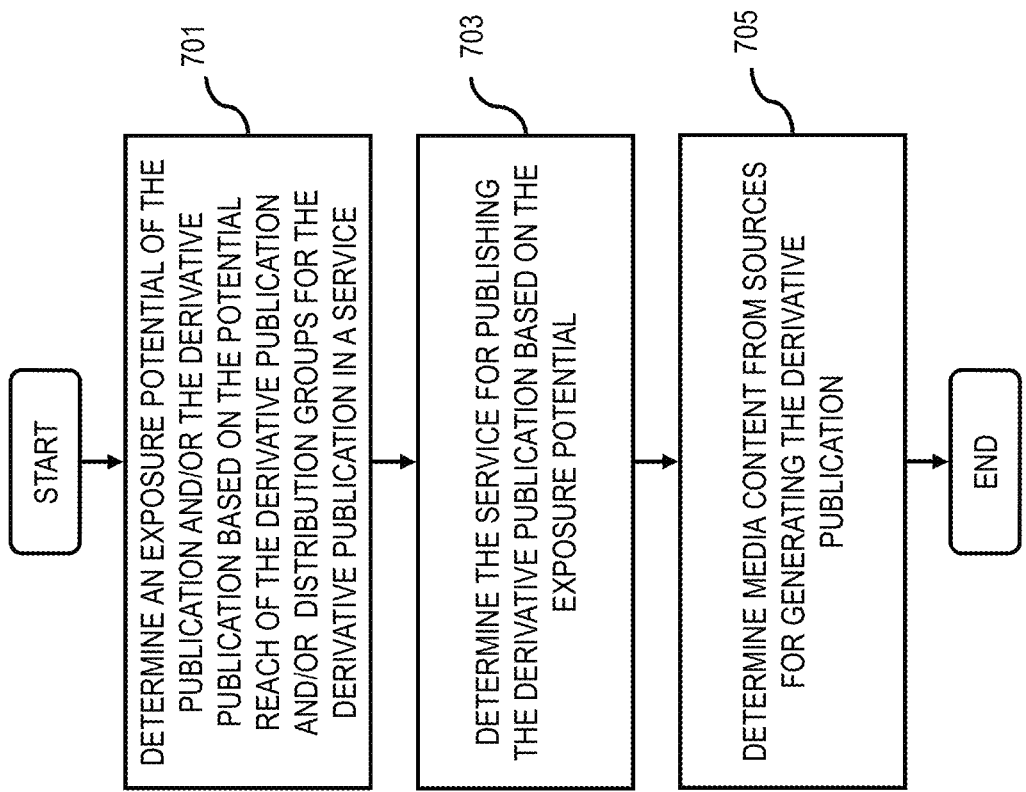
FIG. 7 is a flowchart of a process for determining a service based on exposure potential of a derivative publication, according to one embodiment.

FIG. 7 is a flowchart of a process for determining a service based on exposure potential of a derivative publication, according to one embodiment. In one embodiment, the publishing service platform 109 performs the process 700 and is implemented in, for instance, a chip set including a processor and a memory as shown in FIG. 12. In step 701, the publishing service platform 109 may determine an exposure potential of the at least one publication, the at least one derivative publication, or a combination thereof in the at least one service based, at least in part, on the potential reach of the at least one derivative publication in at least one service, one or more distribution groups for the at least one derivative publication in the at least one service, or a combination thereof. In step 703, the publishing service platform 109 may then determine the at least one service for publishing the at least one derivative publication based, at least in part, on the exposure potential. In one use case, for instance, an article may include a number of different topics. If, for instance, the publishing service platform 109 generates derivative summaries for each of the various topics, each derivative summary may be posted at social media services where their respective topics are the most popular to provide those derivative summaries with the most potential for exposure to users.

In step 705, the publishing service platform 109 may determine media content from one or more sources, wherein the at least one derivative publication is further based, at least in part, on the media content. For example, the publishing service platform 109 obtains from public sources suitable additional inputs to make a split posting more versatile, for example, by supplementing or extending the original publication, a video posting can be created by extracting pictures from an original publication with pictures embedded in it, and supplementing the picture with an audio content that match the text of the original content. Such adjustment is performed automatically on the basis of popularity among the distribution group of the social media service.

Figure 8:
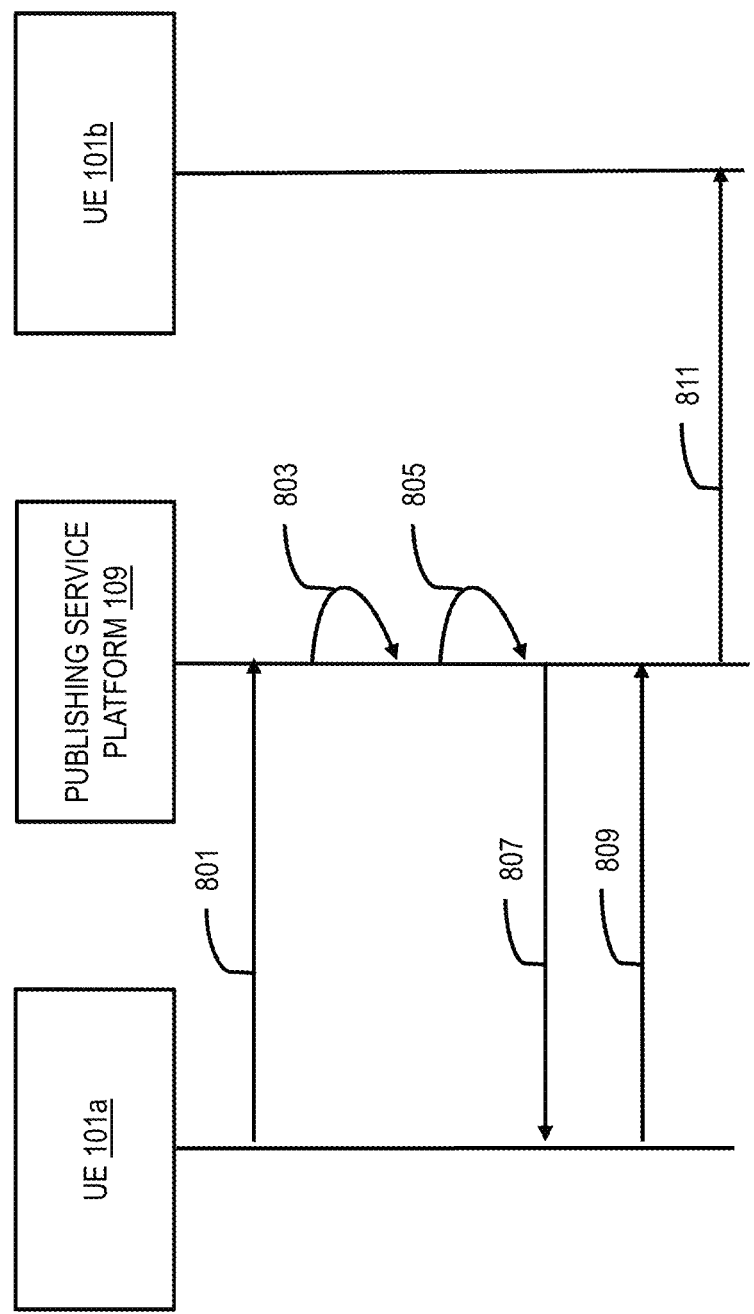
FIG. 8 is a ladder diagram that illustrates a sequence of processes used in a publishing service for providing derivative publications of a publication at one or more services, according to one embodiment.

FIG. 8 is a ladder diagram that illustrates a sequence of processes used in determining derivative publications of a publication at one or more services, according to one embodiment. As shown, in step 801, a UE 101a generates a request for a publication and/or an exposure of the publication, and sends a request to the publishing service platform 109. In response, the publishing service platform 109 retrieves the publication of the UE 101a from the applications 103, the sensors 105, or the message entry platform 111, and processes the published content to obtain a relevant derivative content based on the popularity information associated with the at least one media type and/or on an analysis of the keywords in the contents of the original publication.

Then, in step 803, the publishing service platform 109 processes the publication to generate a derivative publication. A derived publication can be but is not limited to, for example, texts, videos, photos, audios, etc. In one scenario, the publishing service platform 109 processes the content information associated with the publication to modify, condense, extend, and/or merge the content information. The publishing service platform 109 further determines the exposure potential of the publication and/or the derivative publication based on the potential reach of the derivative publication.

In step 805, the publishing service platform 109 then determines a social media service for publishing the derivative publication, wherein the social media service for the derivative publication may, for instance, be determined from one or more applications 103 executed by the UE 101a, one or more sensors 105 associated with the UE 101a, one or more services 115 on the services platform 113, and/or the content providers 117. As discussed, in some embodiments, the publishing service platform 109 determines the service for publishing the derivative publication based on a media type of the derivative publication and/or popularity information associated with a media type of the original publication, the media type of the derivative publication, etc. In addition, the publishing service platform 109 may further the service for publishing the derivative publication based on exposure potential of the derivative publication, the original publication, etc.

In step 807, the publishing service platform 109 presents the user of UE 101a with the generated derivative publication and its recommendation for the targeted social media service for publishing of the derived materials. The user of UE 101a then sends an approval for the publication of the derivative publication to the publishing service platform 109 (step 809). This is followed by the publishing service platform 109 causing transmission of the derivative publication to the identified social media service for publication, which is received by the user of UE 101b, who is a subscriber of the targeted social media service.

Figure 9:
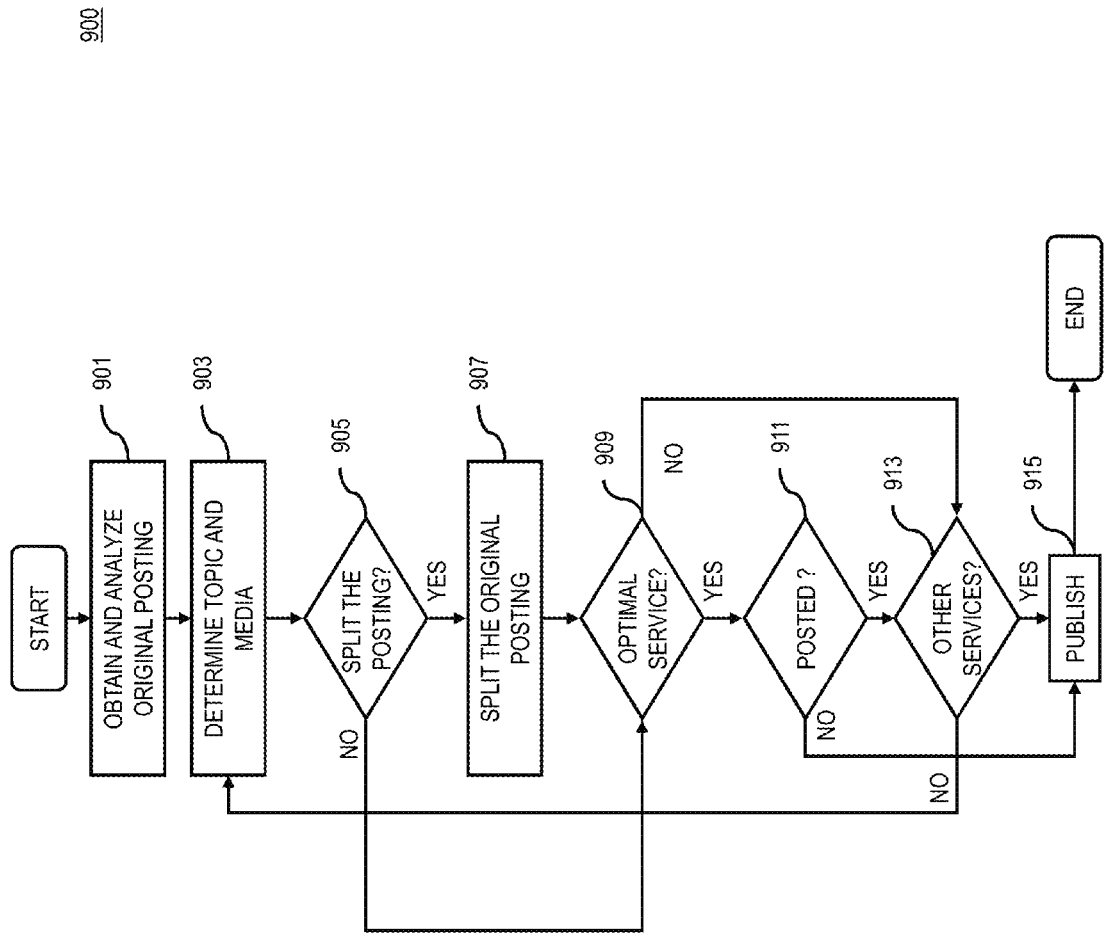
FIG. 9 is a flowchart illustrating a process for determining a social media service that serves the exposure potential of a derivative publication, according to one embodiment.

FIG. 9 is a flowchart illustrating a process for providing a derivative publication of a publication at one or more services, according to one embodiment. By way of example, in step 901, a user creates and submits a publication using the UE 101. The posting transmits through the message entry platform 111 and is delivered to the first intended social media service and a copy of it is delivered to the publishing service platform 109. The publishing service platform 109 obtains the publication and processes it to generate a derivative publication. In step 903, the publishing service platform 109 then determines the topic of the publication by analyzing keywords of the original publication. Further, the publishing service platform 109 determines the media type of the original posting, and then split the original posting into different media types, if possible. For example, a video can be generated from a photo by obtaining a soundtrack.

In step 905, the publishing service platform 109 determines the publication to split it into as many media types as possible. If the publication cannot be split, then the publishing service platform 109 determines other alternative social media service where the original publication can be published in a different format. For example, if the original publication comprises only texts, the publishing service platform 109 can split the publication by summarizing the publication in a paragraph or a sentence and then publish the summary in a different media service to avoid the perception of spamming. In step 907, the publishing service platform 109 splits the original publication into different media types. For example, individual photos may be obtained from a video or automated summarization techniques are available for text content. The publishing service platform 109 can also obtain suitable additional media from public sources to make a split posting more versatile. For example, a video posting may be created from an original text posting by obtaining visual and audio content that match the text.

In step 909, the publishing service platform 109 identifies the optimal social media service for each split posting by determining if a topic (e.g., determined from the original publication) is currently discussed or is in some way relevant at the social media service. As indicated, in some embodiments, the publishing service platform 109 may also post such derived publications as an automatic reply to an earlier posting that has a matching topic at a social media service. In certain embodiments, the publishing service platform 109 causes monitoring of social media services for messages associated with topics related to the publication uploaded by the UE 101, and causes transmission of the derived publication based on such monitoring. In step 911, the publishing service platform 109 determines whether the publication has already been posted in the selected media service. If, for instance, the publication has already been posted, the publishing service platform 109 processes the original publication and split the original publication to generate a derivative publication, to prevent spamming.

In step 913, the publishing service platform 109 determines other alternative social media services available to publish the derived publication, and publishes the derived publication in the alternative social media services for maximum exposure, without spamming. If the derived or original publication has already been published in the available social media service and no other alternative social media service is available, such publication remains archived in database of the message entry platform 111. The archived publications are accessible to the publishing service platform 109 whenever the topic of the publication becomes a "hot topic" in the social media services. In step 915, the publishing service platform 109 presents the user with the derivative publication and its recommendation for the target social media service. The approval of the user of the UE 101 results in transmission of the derived publication to the determined social media service for publication.

Figure 10:
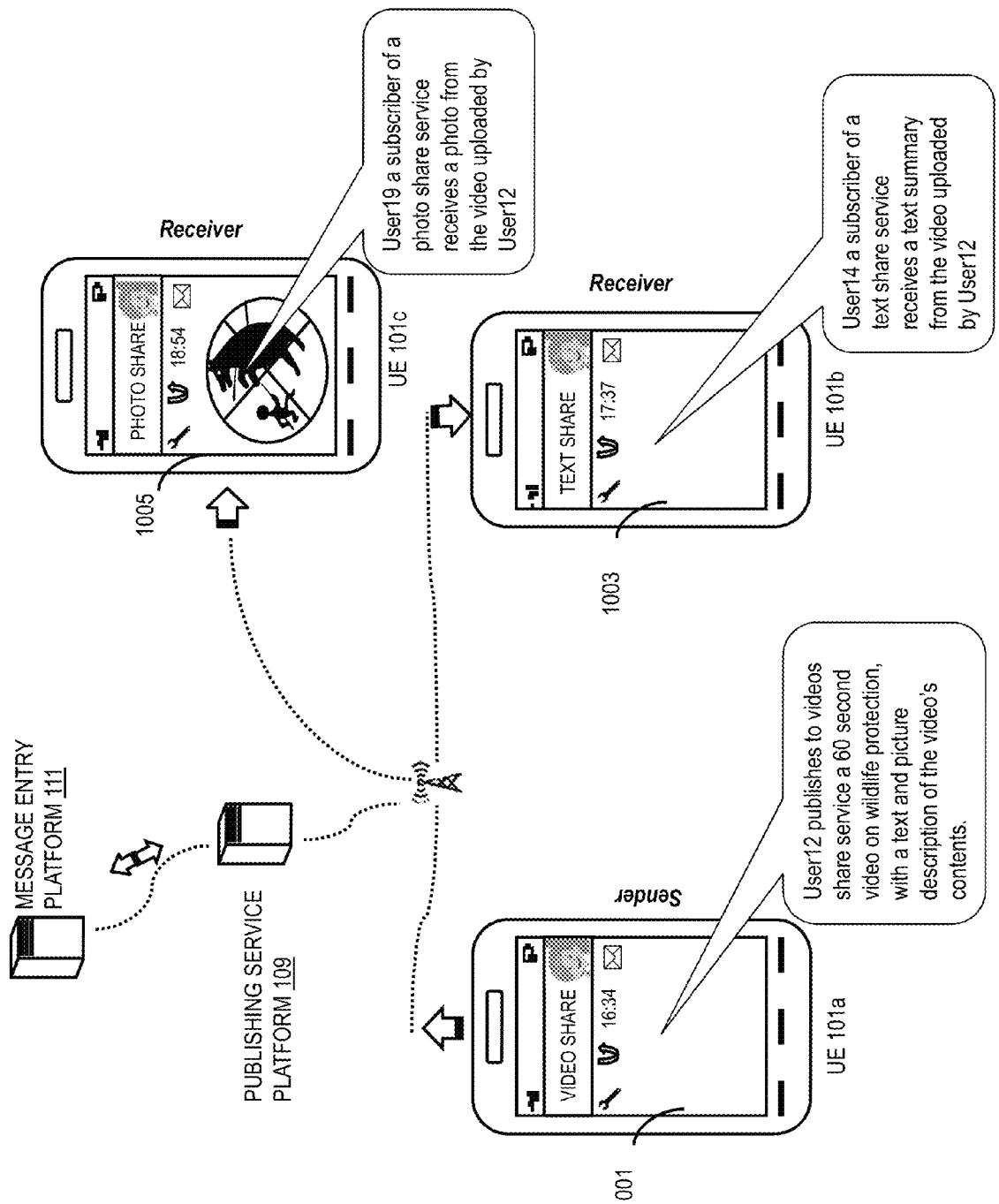
FIG. 10 is a diagram of one or more user interfaces utilized in the process of FIGS. 3-7, according to various embodiments.

FIG. 10 is a diagram of user interfaces utilized in the processes of FIGS. 3-7, according to various embodiments. As illustrated, UE 101a, UE 101b and UE 101c have user interfaces 1001, 1003, and 1005, respectively. Whenever a user-posted content is to be published, the publishing service platform 109 dynamically selects a derivative publication based on the contextual information of the social media service that can be accessed by UE 101a, UE 101b, and UE 101c. The contextual information includes, but is not limited to, popularity of a topic determined from the user-posted content, user preference information regarding published contents, activity information, etc. By way of example, the UE 101a sends a request to the publishing service platform 109 to get a suitable exposure to the posted publications. At the specific time the request is sent, the publishing service platform 109 determines the topic of the original posting by analyzing keywords of the original publication. Further, the publishing service platform 109 determines the media type of the original posting, and then split the original posting into different media types.

According to one embodiment, the publishing service platform 109 splits the original publication into different media types. For example, a user uploads a 60-second video to a video sharing service with a text and picture description of the video contents. Pictures and texts may be extracted from the video, and automated summarization techniques may be utilized for text content. Images, audios, videos, and textual summaries may, for instance, be generated and then variously combined to produce derivative publications (e.g., such as split postings) that can be posted on different social media services. In addition, the publishing service platform 109 can obtain suitable additional media from public sources to make a split posting more versatile. For example, a video posting may be created from an original text posting by obtaining visual and audio content that match the text. The publishing service platform 109 may also add a link associated with the original posting to each split posting.

The processes described herein for providing a derivative publication of a publication at one or more services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FP- GAs), etc. Such exemplary hardware for performing the described functions is detailed below.

Figure 11:
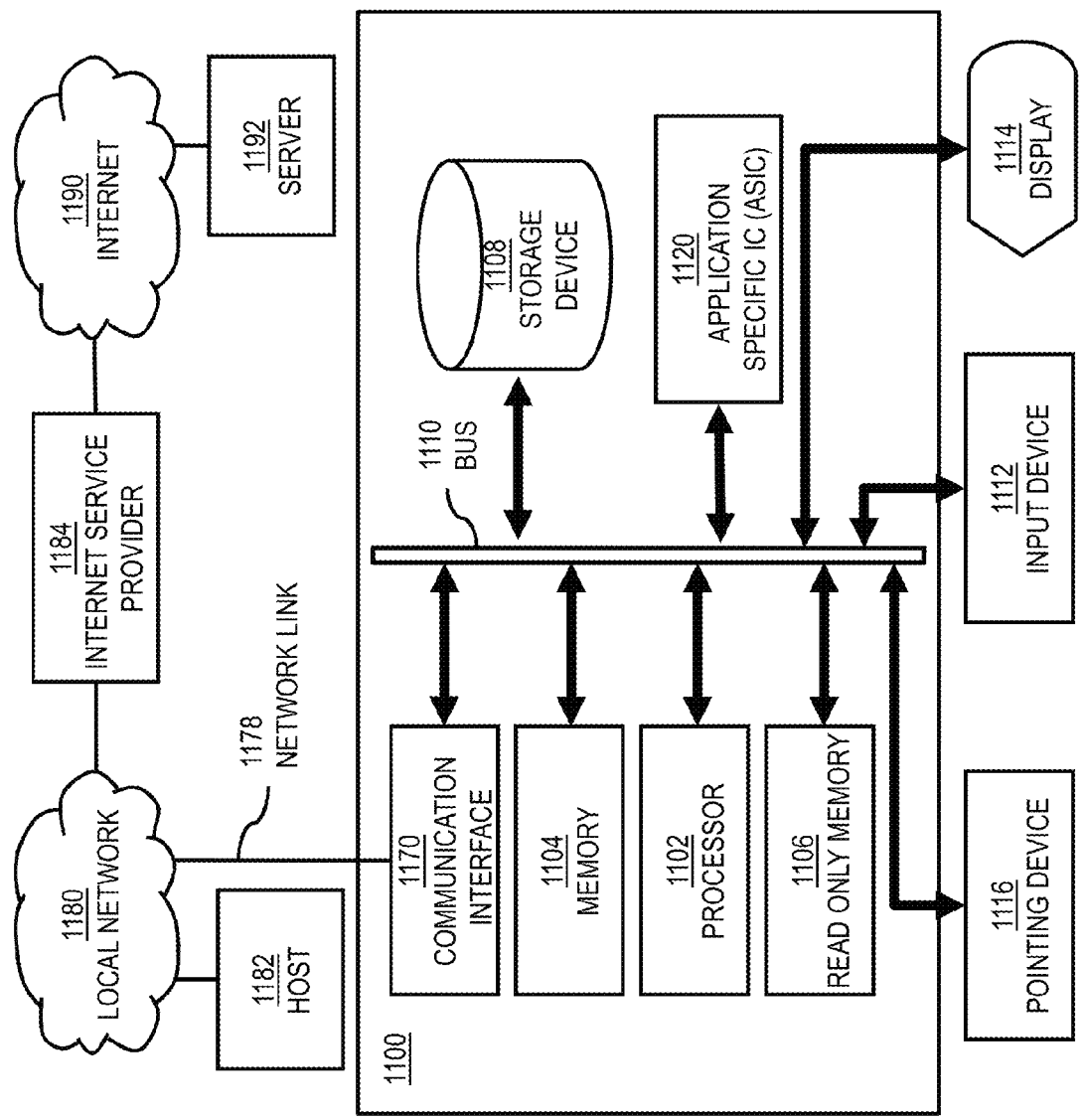
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide a derivative publication of a publication at one or more services as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing a derivative publication of a publication at one or more services.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing a derivative publication of a publication at one or more services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing a derivative publication of a publication at one or more services. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a derivative publication of a publication at one or more services is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for providing a derivative publication of a publication at one or more services to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, worldwide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to provide a derivative publication of a publication at one or more services as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing a derivative publication of a publication at one or more services.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a derivative publication of a publication at one or more services. The memory 1205 also stores the data associated with or generated by the execution of the inventive steps.

Figure 13:
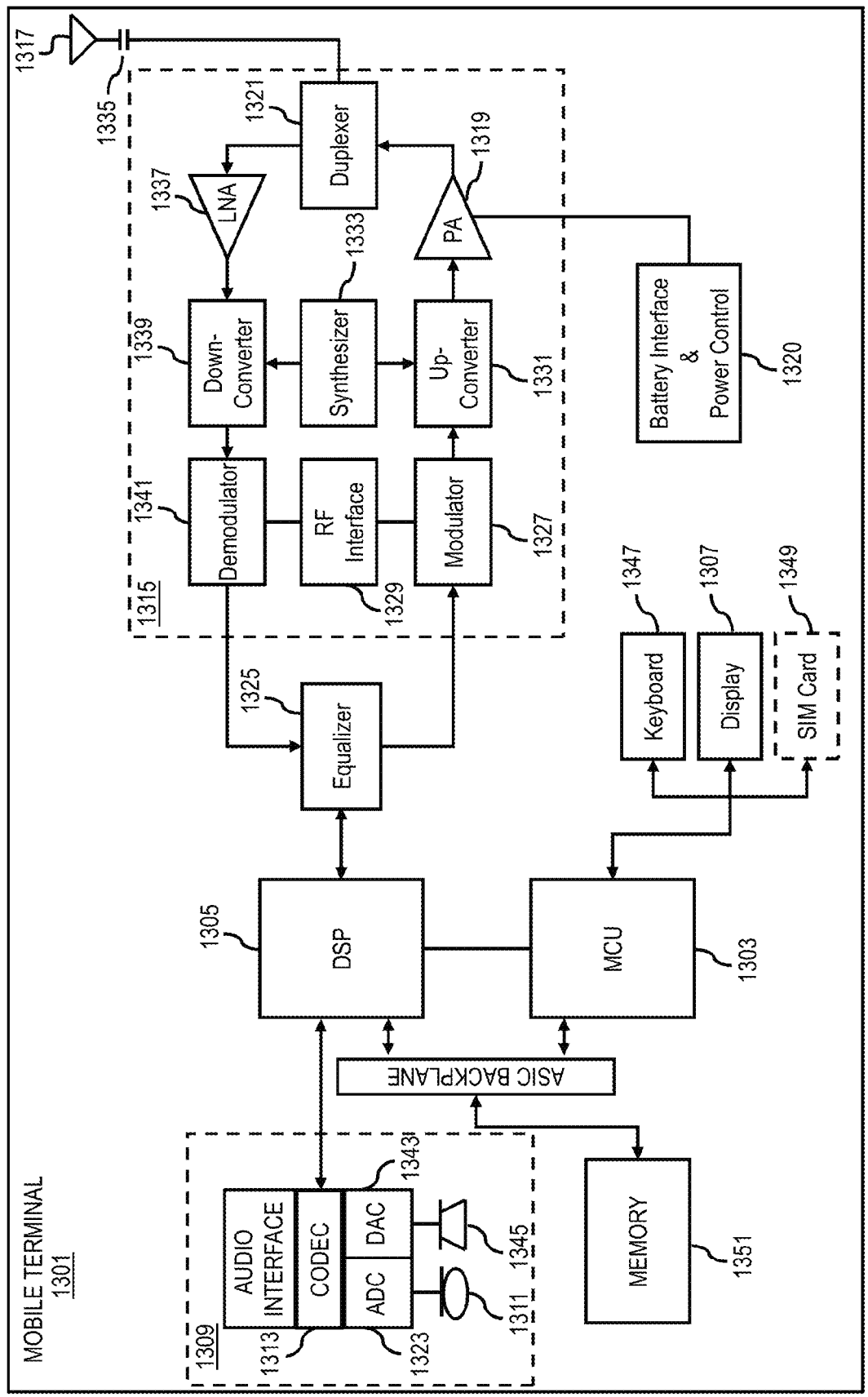
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing a derivative publication of a publication at one or more services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing a derivative publication of a publication at one or more services. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide a derivative publication of a publication at one or more services. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following without user intervention:
   a processing of at least one media content publication of a user to cause, at least in part, a generation of at least one derivative media content publication by condensing, extending, merging, or a combination thereof, content of the at least one media content publication without intervention of the user;
   at least one service for publishing the at least one derivative media content publication; and
   a transmission of the at least one derivative media content publication to the at least one service for publication, wherein the at least one derivative media content publication is made publically available via one or more media content sources.

2. A method of claim 1, wherein the (1) data and/or (2) information and/or (3) at least one signal are further based, at least in part, on the following:
   at least one media type associated with the at least one media content publication; and
   an extraction of the at least one derivative media content publication in at least one other media type from the at least one media content publication without intervention of the user,
   wherein the at least one derivative media content publication is generated without intervention of the user and based, at least in part, on the at least one other media type, popularity information associated with the at least one other media type in the at least one service, or a combination thereof, and
   the at least one media content publication is made into as many derivative media content publications as possible per media type to increase exposure potential of the at least one media content publication.

3. A method of claim 2, wherein the (1) data and/or (2) information and/or (3) at least one signal are further based, at least in part, on the following:
   at least one addition to each of the derivative media content publications an online link towards the at least one media content publication,
   wherein the at least one service generates the media content derivative publications without intervention of the user and based, at least in part, on the at least one other media type, popularity information associated with the at least one media type in the at least one service, or a combination thereof.

4. A method of claim 1, wherein the at least one derivative media content publication is generated without intervention of the user and based, at least in part, on randomization of the media content publication.

5. A method of claim 1, wherein the (1) data and/or (2) information and/or (3) at least one signal are further based, at least in part, on the following:
   a processing of the at least one media content publication to determine a summary and one or more topics without intervention of the user, wherein the summary is made publically available with the at least one derivative media content publication via the one or more sources,
   wherein the at least one derivative publication is generated without intervention of the user and based, at least in part, on the one or more topics and popularity information associated with the one or more topics in the at least one service.

6. A method of claim 5, wherein the (1) data and/or (2) information and/or (3) at least one signal are further based, at least in part, on the following:
   a monitoring of the at least one service for one or more messages matching the one or more topics,
   wherein the transmission, the publication, or a combination thereof of the at least one derivative media content publication in the at least one service is performed without intervention of the user and based, at least in part, on the matching.

7. A method of claim 1, wherein
   the at least one service based, at least in part, on an exposure potential of the at least one media content publication, the at least one derivative publication, or a combination thereof in the at least one service.

8. A method of claim 7, wherein
   the exposure potential is based, at least in part, on the potential reach of the at least one derivative media content publication in the at least one service, one or more distribution groups for the at least one derivative media content publication in the at least one service, via the one or more sources, or a combination thereof.

9. A method of claim 2, wherein the (1) data and/or (2) information and/or (3) at least one signal are further based, at least in part, on the following:
   at least one determination of media content from the one or more sources,
   at least one identification of one or more optimal channels for publication for each of the derivative media content publications, wherein the one or more optimal channels are among the at least one service, one or more distribution groups in the at least one service, the one or more sources, or a combination thereof, and
   wherein the at least one derivative media content publication is further based, at least in part, on the media content, and
   the one or more optimal channels include one or more social channels associated with one or more social media services, one or more social networking services, or a combination thereof.

10. An apparatus comprising:
    at least one processor; and
    at least one memory including computer program code for one or more programs,
    the at least one memory and the computer program code configured to, with the at least one processor, cause the apparatus to perform at least the following without user intervention,
    process and/or facilitate a processing of at least one media content publication of a user to cause, at least in part, a generation of at least one derivative media content publication by condensing, extending, merging, or a combination thereof, content of the at least one media content publication without intervention of the user;
    determine at least one service for publishing the at least one derivative media content publication; and
    cause, at least in part, a transmission of the at least one derivative media content publication to the at least one service for publication, wherein the at least one derivative media content publication is made publically available via one or more media content sources.

11. An apparatus of claim 10, wherein the apparatus is further caused to:
    determine at least one media type associated with the at least one media content publication; and
    cause, at least in part, a extraction of at least one other media type from the at least one media type,
    wherein the at least one derivative media content publication is based, at least in part, on the at least one other media type.

12. An apparatus of claim 11, wherein the apparatus is further caused to:
    determine the at least one service based, at least in part, on the at least one other media type, popularity information associated with the at least one media type in the at least one service, or a combination thereof.

13. An apparatus of claim 10, wherein the apparatus is further caused to:
    determine the at least one derivative media content publication based, at least in part, on a randomization of the media content publication.

14. An apparatus of claim 10, wherein the apparatus is further caused to:
    process and/or facilitating a processing of the at least one media content publication to determine one or more topics; and
    determine the at least one service based, at least in part, on popularity information associated with the one or more topics in the at least one service.

15. An apparatus of claim 14, wherein the apparatus is further caused to:
    cause, at least in part, a monitoring of the at least one service for one or more messages associated with the one or more topics; and
    cause, at least in part, the transmission, the publication, or a combination thereof of the at least one derivative media content publication in the at least one service based, at least in part, on the monitoring.

16. An apparatus of claim 10, wherein the apparatus is further caused to:
    determine the at least one service based, at least in part, on an exposure potential of the at least one media content publication, the at least one derivative publication, or a combination thereof in the at least one service.

17. An apparatus of claim 16, wherein the apparatus is further caused to:
    determine the exposure potential based, at least in part, on the potential reach of the at least one derivative media content publication in the at least one service, one or more distribution groups for the at least one derivative media content publication in the at least one service, or a combination thereof.

18. A method of claim 1, wherein the (1) data and/or (2) information and/or (3) at least one signal are further based, at least in part, on the following without user intervention:
- at least one retrieval of additional media content from the one or more sources, wherein the additional media content is different from the media content publication of the user; and
- at least one supplementation of the at least one derivative media content publication with the additional media content without intervention of the user, wherein the at least one derivative media content publication is made publically available with the supplementation via the one or more media content sources, and
- the additional media content and the media content publication of the user have different media types.

* * * * *